United States Patent [19]

Palmlin et al.

[11] Patent Number: 4,919,953

[45] Date of Patent: Apr. 24, 1990

[54] PROCESS FOR PREPARING A ROOT VEGETABLE COATED AND FRIED FOOD PRODUCT

[75] Inventors: Peter Palmlin; Marianne Rudberg, both of Helsingborg, Sweden

[73] Assignee: Nestec S.A., Vevey, Switzerland

[21] Appl. No.: 321,364

[22] Filed: Mar. 9, 1989

[30] Foreign Application Priority Data

Mar. 19, 1988 [EP] European Pat. Off. ........ 88104427.5

[51] Int. Cl.$^5$ ...................... A23L 1/214; A23L 1/217; A23L 1/314; A23L 1/325
[52] U.S. Cl. .................................. 426/273; 426/293; 426/296; 426/438
[58] Field of Search ................... 426/92, 96, 100, 102, 426/273, 293, 295, 296, 438

[56] References Cited

U.S. PATENT DOCUMENTS

| | | |
|---|---|---|
| 3,486,904 | 12/1969 | Ziegler ............................. 426/92 X |
| 3,622,348 | 11/1971 | Malin ................................ 426/293 |
| 3,761,282 | 9/1973 | Shatila . |
| 3,976,798 | 8/1976 | Young et al. ...................... 426/291 |
| 4,272,553 | 6/1981 | Bengtsson et al. ................. 426/241 |
| 4,351,850 | 9/1982 | Costamagna et al. .............. 426/302 |
| 4,456,624 | 6/1984 | Glantz et al. ...................... 426/96 |
| 4,478,861 | 10/1984 | Montgomery et al. ............. 426/295 |
| 4,559,232 | 12/1985 | Glantz et al. ...................... 426/96 |
| 4,762,083 | 8/1988 | Wadell ................................ 118/16 |
| 4,808,423 | 2/1989 | Hansson ............................. 426/273 |

Primary Examiner—Arthur L. Corbin
Attorney, Agent, or Firm—Vogt & O'Donnell

[57] ABSTRACT

A frozen food product is prepared by coating a foodstuff first with an edible heat-settable adhesive fluid and then with a particulate material, and afterwards frying and deep-freezing the foodstuff, wherein the particulate material is in the form of frozen partially pre-fried particles of fresh root vegetables which particles have a moisture content of from 20% to 50% by weight based on the total weight of the particulate material.

14 Claims, No Drawings

PROCESS FOR PREPARING A ROOT VEGETABLE COATED AND FRIED FOOD PRODUCT

BACKGROUND OF THE INVENTION

The present invention relates to the production of a novel coated foodstuff and more particularly to a foodstuff coated with a particulate material derived from fresh root vegetables.

In the preparation of frozen coated food products such as fish, meat or vegetables suitable for oven-cooking, the foodstuff is usually coated with batter, breaded, prefried, deep-frozen and then packaged. The breading material is normally a particulate material such as bread crumbs or shredded cheese, or it may be a particulate material derived from dehydrated potato, for example, potato flakes, potato powder or potato granules. The average size of the particles is such that they usually have an average diameter of from 0.1 to 2.0 mm and the maximum volume of a particle is not usually more than about 10 cubic millimeters. The amount of breading material used in conventional procedures is normally not more than 10% by weight based on the total weight of the product.

It would, however, be very desirable to use particulate material derived from fresh root vegetables, such as potatoes, not only from an organoleptic point of view but also because the final product would have a significantly lower fat content to products coated with conventional coating materials due to the lower uptake of oil by the fresh vegetable in the pre-frying process. However, all our attempts up to the present time to use such coating materials have not been successful because in conventional equipment the particles of fresh vegetable material tend to stick to the machine or stick together to form agglomerates which complicate the mechanical transport and make it impossible to obtain a satisfactory even coating.

SUMMARY OF THE INVENTION

We have now developed a process for preparing a foodstuff coated with a frozen partially pre-fried particulate material derived from fresh root vegetables in which the particles do not stick to the machine or stick together to form agglomerates and which are distributed evenly upon the foodstuff.

Accordingly, the present invention provides a process for preparing a frozen food product which comprises coating a foodstuff firstly with an edible heat-settable adhesive fluid and then with a particulate material, and afterwards frying and deep-freezing characterised in that the particulate material is applied in the form of frozen partially pre-fried particles of fresh root vegetables which particles have a moisture content from 20% to 50% based on the total weight of the particulate material.

DETAILED DESCRIPTION OF THE INVENTION

The foodstuff may be any foodstuff which may conventionally be coated with particulate material, for example, vegetables, meat or fish. The foodstuff which may be frozen is usually predusted and coated with the edible adhesive fluid by conventional methods before the frozen particulate material is applied. The edible heat-settable adhesive fluid may be, for instance, any type of batter and Tempura batter is particularly suitable.

Preferably the individual frozen partially pre-fried particles of the fresh root vegetables applied to the foodstuff have a volume greater than 20 cubic millimeters, for example, from 30 to 250, preferably from 40 to 200 and especially from 50 to 150 cubic millimeters. Root vegetables which are of particular interest are those which may be cut into relatively firm, substantially uniform pieces, for example, potatoes, carrots, parsnips, celeriac, onions, turnips or swedes. Especially suitable materials are potato cubes or potato strips.

Advantageously, the amount of frozen partially pre-fried particulate material applied to the foodstuff is between 10 and 70%, more preferably from 15 to 50% and especially from 20 to 40% by weight based on the total weight of the prefried frozen food product.

The particles of the fresh root vegetables are partially pre-fried, conveniently in a deep-fat fryer, preferably to a moisture content of from 25% to 45%, more preferably from 28% to 40% and especially from 30% to 38%. The temperature at which the particles are pre-fried is conveniently from 160° C. to 200° C. and preferably from 165° C. to 195° C. The duration of the pre-frying time may conveniently be from 20 to 100 seconds and preferably from 30 to 90 seconds. Before pre-frying, the particulate material is advantageously blanched, for instance, in water at 80° C. to 90° C. for a few minutes, for example, from 3 to 5 minutes. After pre-frying the particulate material is frozen, for instance, in a fluidised bed freezer to obtain a free-flowing material.

During the pre-frying process, the particulate material picks up a certain amount of oil or fat, for instance from about 20% to 26% by weight based on the total weight of the particulate material. The partially pre-fried particulate material is generally free-flowing with a dry non-sticky surface even when thawed. If the particulate material has a moisture content greater than 50%, there are sticking problems and the product is too soggy whereas if the moisture content is less than 20%, the product is too dry.

Conveniently, the foodstuff is predusted before being coated with the edible adhesive fluid with conventional coating materials such as a free flowing flour or starch, for example, semolina, potato starch, milled cracker meal, etc. If the foodstuff is in the frozen condition, the surface is advantageously thawed to form a thin layer of water thereon for instance, by steaming, before being predusted.

It is desirable that the temperature of the partially pre-fried particulate material does not rise appreciably above freezing point during the coating step and it is preferably applied as cold as possible. An especially advantageous coating system is described in our co-pending European patent application No. 86116229.5 where the average holding time in the system is about 30 minutes.

After having been coated with the particulate material, the coated foodstuff is fried, for example by deep-fat frying conveniently at 160° C. to 200° C. for 20 to 120 seconds.

The present invention further provides a frozen food product comprising a foodstuff coated with an edible heat-settable adhesive fluid and a particulate material which is fried before being deep-frozen characterised in that the particulate material applied is in the form of frozen partially pre-fried particles of fresh root vegetables which particles have a moisture content of from 20% to 50% by weight based on the total weight of the particulate material.

In this invention, the application to a foodstuff of a particulate coating material in the form of frozen partially pre-fried particles of fresh root vegetables in larger amounts and comprising particles of a larger size in comparison with conventional coated food products results in an entirely new product concept, with especially desirable organoleptic properties, and a lower fat content the production of which has hitherto not been possible. The products also have an interesting, attractive appearance quite different from conventionally coated products.

The following Example further illustrates the present invention.

EXAMPLE

High quality Saturna potatoes with dry matter content of 22-24% were peeled, washed and cut in an Urschel GK cutter into strips having dimensions of 3.5×9.5×3.2 mm. These strips were blanched at 85° C. for 4 minutes and pre-fried for 45 seconds at 185° C. in a fryer where the inlet oil temperature was 190° C. and the outlet temperature was 170° C. The prefried potato strips had a dry matter content of from 64-68% by weight and a fat content of 22-24% by weight and were free-flowing with a dry non-sticky surface. They were then deep frozen.

Battered frozen fish portions which had initially been deglazed with steam and predusted with grilled cracker meal 454, were coated with 35% by weight based on the total weight of the frozen pre-fried potato strips which had previously been tempered to −2° C. The coated fish portions were then deep-fat fried at 180° C. for 60 seconds and then deep-frozen. The final product weight was 50 g.

The final pre-fried coated fish product had the following composition by weight:

| | |
|---|---|
| Fish | 53% |
| Milled cracker meal 454 | 4% |
| Batter | 18% |
| Potato (including 5% oil/fat) | 20% |
| Oil | 5% |

As can be seen, the oil pick-up during the frying of the coated product is only 5%, and the total oil content is only 10% whereas the oil content of a conventional pre-fried product is usually at least 15%.

When this product is prepared for consumption by oven heating, the potato strips are easily identifiable as potato, they have a crunchy bite and give the experience of eating real potato.

We claim:

1. A process for preparing a frozen food product comprising pre-frying individual particles of fresh root vegetables to a moisture content of from 20% to 50% by weight based on the total weight of the pre-fried particles and then freezing the pre-fried particles, coating a foodstuff with an edible heat-settable adhesive fluid and then coating the adhesive-coated foodstuff with the frozen, pre-fried particles, frying the particles-coated foodstuff and then deep-freezing the fried, coated foodstuff.

2. A process according to claim 1 wherein the edible heat-settable adhesive fluid is a batter.

3. A process according to claim 2 wherein the batter is a Tempura batter.

4. A process according to claim 1 wherein the individual frozen, pre-fried particles for coating the foodstuff have a volume of from 30 to 250 cubic millimeters.

5. A process according to claim 1 wherein the frozen, pre-fried particles coated on the foodstuff are in an amount of from 15% to 50% by weight based on the total weight of the fried, frozen coated foodstuff.

6. A process according to claim 1 wherein the frozen, pre-fried particles have a moisture content of from 28% to 40% by weight based on the total weight of the pre-fried particles.

7. A process according to claim 1 wherein the particles of fresh root vegetables are fresh potatoes.

8. A process according to claim 1 wherein the particles of fresh-root vegetables are pre-fried at a temperature of from 165° C. to 195° C.

9. A process according to claim 8 wherein the particles of fresh root vegetables are pre-fried for from 30 seconds to 90 seconds.

10. A process according to claim 1 further comprising blanching the particles of fresh root vegetables and then pre-frying the blanched particles.

11. A process according to claim 1 wherein the pre-fried particles are frozen in a fluidised bed.

12. A process according to claim 1 further comprising predusting the foodstuff and then coating the predusted foodstuff with the edible heat-settable adhesive fluid.

13. A process according to claim 12 wherein the foodstuff is predusted with a material selected from a group consisting of a flour and a starch.

14. A process according to claim 1 wherein the particle-coated foodstuff is fried at a temperature of from 160° C. to 200° C. for a period of from 20 seconds to 120 seconds.

* * * * *

UNITED STATES PATENT AND TRADEMARK OFFICE
CERTIFICATE OF CORRECTION

PATENT NO. : 4,919,953

DATED : April 24, 1990

INVENTOR(S) : Peter PALMLIN, et al.

It is certified that error appears in the above-identified patent and that said Letters Patent is hereby corrected as shown below:

Column 4, lines 11-12 (lines 8-9 of claim 1), "particles-coated" should be --particle-coated--.

Signed and Sealed this

Ninth Day of April, 1991

Attest:

HARRY F. MANBECK, JR.

Attesting Officer

Commissioner of Patents and Trademarks